United States Patent
Suzuki et al.

(10) Patent No.: US 10,150,849 B2
(45) Date of Patent: Dec. 11, 2018

(54) THERMALLY-EXPANDABLE MICROSPHERES, AND COMPOSITION AND MOLDED ARTICLE CONTAINING SAME

(71) Applicant: Kureha Corporation, Tokyo (JP)

(72) Inventors: Yasuhiro Suzuki, Tokyo (JP); Naoko Kuriu, Tokyo (JP); Shintaro Nomura, Tokyo (JP); Tetsuo Ejiri, Tokyo (JP); Shunzo Endo, Tokyo (JP)

(73) Assignee: Kureha Corporation, Tokyo (JP)

(*) Notice: Subject to any disclaimer, the term of this patent is extended or adjusted under 35 U.S.C. 154(b) by 0 days.

(21) Appl. No.: 15/531,613

(22) PCT Filed: Dec. 8, 2015

(86) PCT No.: PCT/JP2015/084376
§ 371 (c)(1),
(2) Date: May 30, 2017

(87) PCT Pub. No.: WO2016/093220
PCT Pub. Date: Jun. 16, 2016

(65) Prior Publication Data
US 2018/0282503 A1  Oct. 4, 2018

(30) Foreign Application Priority Data

Dec. 8, 2014  (JP) .................. 2014-247992

(51) Int. Cl.
C08J 9/16  (2006.01)
C08J 9/20  (2006.01)
C08F 220/48  (2006.01)
C08J 9/14  (2006.01)
B01J 13/14  (2006.01)

(52) U.S. Cl.
CPC ............... *C08J 9/20* (2013.01); *B01J 13/14* (2013.01); *C08F 220/48* (2013.01); *C08J 9/141* (2013.01); *C08J 2201/026* (2013.01); *C08J 2203/14* (2013.01); *C08J 2203/182* (2013.01); *C08J 2203/202* (2013.01); *C08J 2433/20* (2013.01)

(58) Field of Classification Search
CPC ...................................... C08J 9/16
See application file for complete search history.

(56) References Cited

U.S. PATENT DOCUMENTS

| | | |
|---|---|---|
| 7,232,607 B2 | 6/2007 | Satake et al. |
| 7,252,882 B2 | 8/2007 | Satake et al. |
| 7,566,498 B2 | 7/2009 | Tokumura et al. |
| 8,058,320 B2 | 11/2011 | Ejiri et al. |
| 8,247,465 B2 | 8/2012 | Inohara et al. |
| 8,324,286 B2 | 12/2012 | Masuda et al. |
| 2001/0051666 A1 | 12/2001 | Kron et al. |
| 2007/0219281 A1* | 9/2007 | Ejiri ............ B01J 13/14 521/56 |
| 2010/0204349 A1 | 8/2010 | Inohara et al. |

FOREIGN PATENT DOCUMENTS

| | | |
|---|---|---|
| EP | 1952881 A1 | 8/2008 |
| EP | 2204428 A1 | 7/2010 |
| JP | 2002012693 A | 1/2002 |
| JP | 2012122025 A | 6/2012 |
| JP | 2012513487 A | 6/2012 |
| JP | 2013212432 A | 10/2013 |
| WO | WO2004058910 A1 | 7/2004 |
| WO | WO2006030946 A1 | 3/2006 |
| WO | WO2009050863 A1 | 4/2009 |
| WO | WO2010072663 A1 | 7/2010 |

OTHER PUBLICATIONS

Search Report from European Patent Office for PCT/JP2015/084376/EP15867252.7 dated Jan. 4, 2018.
First Office Action of the Korean Intellectual Property Office for PCT/JP2015/084376/KR10-2017-7011548 dated Jun. 9, 2017.
First Office Action of the Japanese Patent Office for PCT/JP2015/084376/JP2016-563680 dated Aug. 8, 2017.
Translation of the First Office Action of the Japanese Patent Office for PCT/JP2015/084376/JP2016-563680 dated Aug. 8, 2017.
International Search Report for PCT/JP2015/084376 dated Mar. 15, 2016.

* cited by examiner

*Primary Examiner* — Kara B Boyle
(74) *Attorney, Agent, or Firm* — Thomas F. Quinn, Jr.

(57) ABSTRACT

Object:
To provide thermally expandable microspheres having little sag.

Resolution Means:

The thermally expandable microspheres have a structure in which a foaming agent is encapsulated in an outer shell formed from a polymer, wherein, the ratio (%) of (R2/R1)× 100 is at least 105%, where R1 is the expansion ratio after the thermally expandable microspheres have been heat-treated for 5 minutes at 150° C. and then foamed by heating for 2 minutes at 200° C., and R2 is the expansion ratio after the thermally expandable microspheres have been heat-treated for 5 minutes at 150° C. and then foamed by heating for 4 minutes at 200° C.

10 Claims, No Drawings

THERMALLY-EXPANDABLE MICROSPHERES, AND COMPOSITION AND MOLDED ARTICLE CONTAINING SAME

TECHNICAL FIELD

Among thermally expandable microspheres (hereinafter, also abbreviated as a "thermally expandable MS") having a structure in which a foaming agent is encapsulated in an outer shell formed from a polymer, the present invention relates to thermally expandable MSs having a large average particle size, a high foaming initiation temperature, a high expansion ratio, and little sag. Furthermore, the present invention relates to a composition containing the thermally expandable MSs and a polymer material, and an article containing foamed particles obtained by heating and foaming the thermally expandable MSs.

BACKGROUND ART

A thermally expandable MS is obtained by microcapsulating a volatile foaming agent with a polymer and is also called a thermally expandable microcapsule or a thermally expandable microsphere. In general, the thermally expandable MS can be produced by a method in which a polymerizable monomer mixture containing at least one type of polymerizable monomers and a volatile foaming agent is suspension-polymerized in an aqueous dispersion medium. An outer shell (shell) is formed by a polymer formed as a polymerization reaction progresses, thereby obtaining the thermally expandable MS having a structure in which the foaming agent is encapsulated in the outer shell.

As the polymer forming the outer shell, a thermoplastic resin having good gas barrier properties is ordinarily used. The polymer forming the outer shell is softened by heating, and foamed. As the foaming agent, a low-boiling compound such as a hydrocarbon which becomes a gaseous state at a temperature equal to or lower than the softening point of the polymer forming the outer shell is typically used. When the thermally expandable MS is heated, the foaming agent vaporizes, and the expanding force thereof acts on the outer shell; however, at the same time, the elastic modulus of the polymer forming the outer shell rapidly decreases. Rapid expansion therefore occurs at a certain temperature serving as a boundary. This temperature is referred to as a foaming initiation temperature. When the thermally expandable MS is heated to a temperature equal to or higher than the foaming initiation temperature, the thermally expandable MS itself expands to form a foamed particle (closed-cell foamed particle). The expansion ratio refers to a value calculated by dividing a volume of foamed particles by a volume of an unfoamed thermally expandable MS.

However, thermally expandable MSs involve a problem of sag due to gas escaping after the foaming. The sag is a phenomenon in which, when a thermally expandable MS is heated, the outer shell first starts to soften and, at the same time, the foaming agent encapsulated therein starts to gasify to raise the internal pressure into an expanded state and, when the heating is further continued, the thermally expandable MS starts to shrink because gas passes and diffuses through the outer shell thinned by the expansion. The sag also relates to heat resistance of the thermally expandable MS and problems in elasticity, thermal stability, and the like.

Especially when the thermally expandable MSs are used to reduce weight, since the average particle size of the thermally expandable MSs is greater and a higher expansion ratio contributes better to the weight reduction, the thermally expandable MSs are required to have a large average particle size and a high expansion ratio. At the same time, from the perspective of ease in processing and molding, higher foaming initiation temperature and reduction in occurrence of sag have been demanded.

To produce the thermally expandable MS having a large particle size, Patent Document 1 describes a method using a colloidal silica aggregate. However, in Patent Document 1, a carboxyl group-containing monomer as a polymerizable monomer and a thermosetting resin are contained, and specifically, a methacrylic acid and a bisphenol A-type epoxy resin are contained without exception.

Patent Document 2 discloses a thermally expandable MS having excellent heat resistance and solvent resistance and excellent foamability in a temperature range of 200° C. or higher. However, as monomers, a nitrile-based monomer, a monomer having a carboxyl group, a monomer having an amide group, and a monomer having a cyclic structure in a side chain thereof are used without exception. Specifically, as the monomer having a carboxyl group, methacrylic acid is used. In the case of Patent Document 2, the average particle size is specifically from 12 to 30 μm.

Patent Document 3 discloses a thermally expandable MS that has high heat resistance and that reduces expansion initiation temperature when a heat treatment is performed at a temperature lower than the expansion initiation temperature. However, in Patent Document 3, the outer shell contains a copolymer obtained by polymerizing a polymerizable component containing a carboxyl group-containing monomer without exception. Specifically, methacrylic acid is used. In the case of Patent Document 3, the average particle size is specifically from 20 to 39 μm.

Patent Document 4 describes use of a bifunctional crosslinkable monomer to make a thermally expandable MS having the maximum expansion ratio of at least 5. However, the average particle size is approximately 30 μm and the maximum expansion ratio is specifically approximately from 30 to 60.

Patent Document 5 discloses a thermally expandable MS including isododecane as a foaming agent. However, the expansion ratio after 2 minutes of heat treatment at 170° C. and then 2 minutes of heating and forming at 200° C. was at most 46 in the examples, and the expansion ratio after 2 minutes of heat treatment at 170° C. and then 4 minutes of heating and forming at 200° C. was a little less than the expansion ratio of the case where 2 minutes of heating and foaming at 200° C. was employed.

CITATION LIST

Patent Literature

Patent Document 1: JP-A-2013-212432
Patent Document 2: WO 2004/058910A1
Patent Document 3: JP-A-2012-122025
Patent Document 4: JP-A-2002-012693
Patent Document 5: Republication WO 2006/030946

SUMMARY OF INVENTION

Technical Problem

An object of the present invention is to provide a thermally expandable MS having little sag. Another object of the present invention is to provide thermally expandable MSs having a large average particle size, a high foaming initiation temperature, and a high expansion ratio.

Another object of the present invention is to provide a composition containing the thermally expandable MSs and a polymer material, and an article containing foamed particles obtained by heating and foaming the thermally expandable MSs.

To achieve the objects described above, the inventors of the present invention started investigating the characteristics (performances) and component factors of thermally expandable MSs.

As is clear from Patent Documents described above, thermally expandable MSs have various component factors, and the characteristics thereof are significantly affected by the component factors that have been combined in a complex manner.

This indicates that, when changes, such as elimination or addition of the component factors or decreasing or increasing the range of the component factors, are made to achieve a certain characteristic, it is difficult to predict the characteristics of the thermally expandable MSs after the modification from the characteristics of the thermally expandable MSs prior to the modification.

Characteristics related to a large average particle size, a high foaming initiation temperature, a high expansion ratio, and little sag which are objects to be achieved of the present invention are characteristics related to heat resistance. These characteristics are significantly related to component factors, especially components (constitution) of the outer shell polymer, i.e. components of polymerizable monomer forming the polymer constituting the outer shell (hereinafter, also abbreviated as "polymerizable monomer of outer shell"), the thickness of layer of polymer constituting the outer shell, the chemical structure or amount of polymerizable monomer, conditions of foaming agent (type of foaming agent, amount ratio), average particle size, controlling of polymerization conditions, and the like.

Especially, when heat resistance of the thermally expandable MS is taken into consideration, as measures to solve the problems, particularly important points are: 1) employing polymer constitution of outer shell having excellent heat resistance, and 2) investigating a foaming agent or the like having excellent foaming behavior at high temperatures.

As a method to enhance the heat resistance of the polymer of the outer shell, a method which uses a methacrylic acid as a polymerizable monomer of the outer shell has been known. In this method, the outer shell polymer is made tight by using a thermosetting resin similarly to Patent Document 1 and a monomer having an amide group similarly to Patent Document 2 together to perform a chemical reaction of the thermosetting resin and/or the amide group via a carboxyl group. That is, the methacrylic acid also serves as one type of cross-linking agent to tighten the outer shell polymer.

However, this method has disadvantages including the following: the effect thereof is not sufficiently achieved depending on the conditions of the chemical reaction; dispersion of the polymerizable monomer mixture (oil phase) during polymerization is less likely to be stable; abnormal polymerization occurs in an aqueous dispersion medium other than the oil droplets; molding processing conditions are limited due to a large number of sags present during molding processing including a foaming step of the obtained thermally expandable MSs; and the thermal stability deteriorates.

In such circumstances, based on the reasons described above, the inventors of the present invention considered that development of the thermally expandable MSs without using methacrylic acid as the polymerizable monomer of the outer shell was necessary to further enhance the characteristics of the thermally expandable MSs and to achieve the objects described above, and thus meeting market demands to make the performance of the thermally expandable MSs even higher. The inventors of the present invention thus started development and research based on the results of study.

To solve the problems described above, the inventors of the present invention diligently researched and developed to ensure exhibition of effects by the component factors described above and in the case where these component factors are combined, without using methacrylic acid, because the use of a foaming agent having a high foaming initiation temperature and the use of no methacrylic acid are presumably in the opposite direction when enhancement of heat resistance of thermally expandable MSs is attempted (i.e. "not aiming at tightening of the outer shell by methacrylic acid" and "use of a foaming agent having a high foaming initiation temperature" are contradictory to each other).

As a result, it was found that, by precisely adjusting the constitution of the polymerizable monomer of the outer shell, amount of crosslinkable monomer, thickness of polymer layer of the outer shell (i.e. the thickness of the outer shell is greater when the average particle size thereof is larger if the amount ratio of a foaming agent is constant relative to the polymer of the outer shell), and the like, i.e. by precisely adjusting the thickness of the polymer layer of the outer shell, crosslinking polymerization, and the like while mainly employing a (meth)acrylonitrile (co)polymer having a high softening point due to the strong intermolecular force of the nitrile group, it is possible to increase elasticity and expansibility of the polymer of the outer shell relative to a temperature while the effect on heat resistance is small even when the disadvantages in heat resistance of using no methacrylic acid is taken into consideration, thereby achieving high heat resistance.

It was found that, by precisely combining this and the type and amount ratio of a particular foaming agent having a high boiling point and by employing the most appropriate polymerization formulation, the effect of heat resistance can be significantly maximized in a degree that had been unpredictable from the conventional effects, and thus the present invention was completed.

That is, the thermally expandable MSs of the present invention, surprisingly, showed foaming behaviors that achieved the expansion ratio of 60 or greater when 5 minutes of heat treatment at 150° C. and then 2 minutes of foaming by heating at 200° C. was performed, and the expansion ratio of 70 or greater when 5 minutes of heat treatment at 150° C. and then 4 minutes of foaming by heating at 200° C. was performed, and the expansion ratio was increased by 105% or greater compared to the case where 2 minutes of heating was performed at 200° C., which indicated that the expansion ratio was increased even when the heating time at 200° C. was doubled. This phenomenon indicates that the expansion ratio was high and no sags were caused when the 4 minutes of heating at 200° C. was performed. In Patent Document 5, the value of (expansion ratio after 4 minutes of foaming by heating at 200° C.)/(expansion ratio of 2 minutes of foaming by heating at 200° C.)×100 after 2 minutes of heat treatment at 170° C. was 86% in Example 1, 87% in Example 2, and 79% in Example 3, calculated as described below. That is, Patent Document 5 cannot achieve 90% or greater. The foaming behavior of the present invention was surprising compared to these results.

As described above, the inventors of the present invention found that, by precisely adjusting the component of polymerizable monomer, amount of crosslinkable monomer, thickness of outer shell polymer layer, type and amount of foaming agent, and the like without using methacrylic acid as a polymerizable monomer forming the outer shell of the thermally expandable MSs and by researching to maximize the complex effect which is difficult to predict from these component factors, thermally expandable MSs having a large average particle size, a high foaming initiation temperature, a large expansion ratio, and little sag can be obtained.

The present invention was completed based on these findings.

Solution to Problem

According to the present invention, the present invention provides (1) a thermally expandable MS having a structure in which a foaming agent is encapsulated in an outer shell formed from a polymer, (i) the outer shell being formed from (meth)acrylonitrile (co)polymer obtained by polymerizing polymerizable monomers and a crosslinkable monomer; (ii) the polymerizable monomers being at least one type of nitrile monomer selected from the group consisting of acrylonitrile and methacrylonitrile as a main component and another vinyl monomer that is not methacrylic acid and that is copolymerizable with the nitrile monomer; (iii) an amount of the crosslinkable monomer being from 0.9 to 1.4 parts by mass per 100 parts by mass of the polymerizable monomers; (iv) the foaming agent being a mixed foaming agent containing an isododecane isomer mixture and an isooctane isomer mixture; and (viii) a ratio (%) of (R2/R1)×100 being at least 105%, where R1 is an expansion ratio after the thermally expandable microsphere has been heat-treated for 5 minutes at 150° C. and then foamed by heating for 2 minutes at 200° C., and R2 is an expansion ratio after the thermally expandable microsphere has been heat-treated for 5 minutes at 150° C. and then foamed by heating for 4 minutes at 200° C.

According to the present invention, (2) the thermally expandable MS of (1) above, in which (v) an amount of the foaming agent is from 20 to 40 parts by mass per 100 parts by mass of the polymerizable monomers, is provided; (3) the thermally expandable MS of (1) above, in which (vi) an average particle size of the thermally expandable MS is from 40 to 200 μm, is provided; and (4) the thermally expandable MS of (1) above, in which (vii) when the thermally expandable MS has not been undergone heat treatment, a foaming initiation temperature is 190° C. or higher, is provided.

Furthermore, according to the present invention, (5) the thermally expandable MS of (1) above, in which (iv) above is (iva) the foaming agent being a mixed foaming agent A including an isododecane isomer mixture and an isooctane isomer mixture or a mixed foaming agent B including an isododecane isomer mixture, isooctane isomer mixture, and saturated hydrocarbon having 7 or less carbons, is provided.

Furthermore, according to the present invention, (6) the thermally expandable MS of (1) above, in which (iv) above is (ivb), when a total amount of the foaming agent is 100 mass %, the foaming agent being a mixed foaming agent A including from 50 to 75 mass % of the isododecane isomer mixture and from 25 to 50 mass % of the isooctane isomer mixture or a mixed foaming agent B including from 45 to 55 mass % of the isododecane isomer mixture and from 30 to 41.5 mass % of the isooctane isomer mixture as main components, and from 3.5 to 25 mass % of the saturated hydrocarbon having 7 or less carbons as the other component, is provided.

Furthermore, according to the present invention, (7) the thermally expandable MS of (5) or (6) above, in which the saturated hydrocarbon having 7 or less carbons is an isopentane isomer mixture, is provided.

Furthermore, according to the present invention, (8) the thermally expandable MS of any one of (1) to (7) above, in which the isododecane isomer mixture contains from 0 to 12 mass % of a saturated hydrocarbon having 13 or more carbons when a total amount of the isododecane isomer mixture is 100 mass %, is provided.

Furthermore, according to the present invention, (9) the thermally expandable MS of any one of (1) to (8) above, in which (ii) above are (iia) the polymerizable monomers being at least one type of nitrile monomer selected from the group consisting of acrylonitrile and methacrylonitrile as a main component and another vinyl monomer that is not a vinyl monomer having a carboxyl group and that is copolymerizable with the nitrile monomer, is provided.

Furthermore, according to the present invention, (10) the thermally expandable MS of any one of (1) to (9) above, in which (ix) the expansion ratio (R1) after the thermally expandable MSs have been heat-treated for 5 minutes at 150° C. and then foamed by heating for 2 minutes at 200° C. is 60 or greater, are provided.

Furthermore, according to the present invention, (11) the thermally expandable MS of any one of (1) to (10) above, in which (x) a foaming initiation temperature after heat treatment for 5 minutes at 150° C. is 175° C. or lower and a highest foaming temperature after heat treatment for 5 minutes at 150° C. is 180° C. or higher, are provided.

Furthermore, according to the present invention, (12) a production method of the thermally expandable MSs of (1) to (11) above, the method including steps (i) to (iii) below: (i) preparing an aqueous dispersion medium containing from 0.3 to 6 parts by mass of colloidal silica, a condensation product, water, an inorganic salt, and alkali metal nitrite per 100 parts by mass of the polymerizable monomers; (ii) preparing a polymerizable monomer mixture containing at least one type of nitrile monomer selected from the group consisting of acrylonitrile and methacrylonitrile as a main component and another vinyl monomer that is not methacrylic acid and that is copolymerizable with the nitrile monomer, from 0.9 to 1.4 parts by mass of a crosslinkable monomer, and from 20 to 40 parts by mass of a mixed foaming agent containing an isododecane isomer mixture and an isooctane isomer mixture, per 100 parts by mass of the polymerizable monomers; and (iii) stirring and mixing the aqueous dispersion medium and the polymerizable monomer mixture to perform suspension polymerization, is provided.

Furthermore, according to the present invention, (13) a composition containing the thermally expandable MS of (1) to (11) above and at least one type of polymer material is provided.

Furthermore, according to the present invention, (14) an article containing a foamed particle obtained by heating and foaming the thermally expandable MS of (1) to (11) above is provided.

Advantageous Effects of Invention

Since the thermally expandable MSs of the present invention have little sag, excellent cushioning property, reduction in weight, thermal insulation property, and sound insulating property can be achieved with a foam molded article produced using the thermally expandable MSs. Furthermore, since the thermally expandable MSs of the present invention have a large average particle size, a high foaming initiation temperature, and a high expansion ratio, excellent cushioning property, reduction in weight, thermal insulation property, and sound insulating property can be achieved with a foam molded article produced using the thermally expandable MSs.

Furthermore, since the thermally expandable MSs of the present invention can sufficiently increase the foaming initiation temperature, undesired early foaming can be effectively suppressed even if the thermally expandable MSs are heated to a high temperature when being mixed with various synthetic resins, rubbers, or binder resins.

DESCRIPTION OF EMBODIMENTS

The thermally expandable MSs of the present invention have a structure in which a foaming agent is encapsulated in an outer shell formed from a polymer. The thermally expandable MSs having such a structure can be produced by subjecting a foaming agent, a crosslinkable monomer, and at least one type of polymerizable monomer to suspension polymerization in an aqueous dispersion medium containing a dispersion stabilizer, and an outer shell formed from the polymer is an outer shell formed from a (meth)acrylonitrile (co)polymer obtained by polymerizing the polymerizable monomer(s) and the crosslinkable monomer.

(1) Polymerizable monomer

In the thermally expandable MSs of the present invention, the polymer forming the outer shell is preferably a polymer having excellent gas barrier properties, and more preferably a polymer having excellent gas barrier properties, heat resistance, and solvent resistance. An object of the present invention is to obtain thermally expandable MSs having a high foaming initiation temperature. Thus, as a polymer forming an outer shell, a particular (meth)acrylonitrile (co) polymer is used. Note that (meth)acrylonitrile refers to acrylonitrile and/or methacrylonitrile.

In the present invention, the polymerizable monomers are at least one type of nitrile monomer selected from the group consisting of acrylonitrile and methacrylonitrile as a main component (hereinafter, also abbreviated as "nitrile monomer that is (meth)acrylonitrile") and another vinyl monomer that is not methacrylic acid and that is copolymerizable with the nitrile monomer.

That is, when the amount of the polymerizable monomers is 100 mass %, the amount of the nitrile monomer that is (meth)acrylonitrile is 50 mass % or greater.

As the vinyl monomer that is copolymerizable with (meth)acrylonitrile, vinylidene chloride, acrylate, methacrylate, styrene, and vinyl acetate are preferred. However, in the present invention, a vinyl monomer having a carboxyl group, especially methacrylic acid, is not used as the vinyl monomer that is copolymerizable with (meth)acrylonitrile.

Furthermore, as the vinyl monomer that is copolymerizable with (meth)acrylonitrile, another vinyl monomer that is not a vinyl monomer having a carboxyl group may be used and, in particular, another vinyl monomer that is not methacrylic acid is used. That is, the polymerizable monomers may be a nitrile monomer that is (meth)acrylonitrile as a main component and another vinyl monomer that is not a vinyl monomer having a carboxyl group and that is copolymerizable with the nitrile monomer.

In this case, the vinyl monomer having a carboxyl group is a vinyl monomer having one or more free carboxylic groups per molecule, and typical examples thereof include, other than methacrylic acid, acrylic acid, maleic acid, maleic anhydride, and itaconic acid.

When the used proportion of (meth)acrylonitrile is large, the softening point of the (meth)acrylonitrile (co)polymer is increased and even a high foaming initiation temperature can be handled.

Examples of the (co)polymer having a high used proportion of (meth)acrylonitrile include (meth)acrylonitrile (co) polymers obtained using, as the polymerizable monomers (total amount is 100 mass %), from 70 to 100 mass % of a nitrile monomer that is (meth)acrylonitrile and from 0 to 30 mass % of at least one type of other vinyl monomers selected from the group consisting of vinylidene chloride, acrylate, methacrylate, styrene, and vinyl acetate (hereinafter, also abbreviated as "another vinyl monomer").

Furthermore, as the (meth)acrylonitrile (co)polymer, (meth)acrylonitrile (co)polymers obtained using, as the polymerizable monomers (total amount is 100 mass %), from 51 to 100 mass % of a nitrile monomer that is (meth)acrylonitrile, from 0 to 40 mass % of vinylidene chloride, from 0 to 48 mass % of at least one type of vinyl monomers selected from the group consisting of acrylate and methacrylate is also exemplified.

Furthermore, to obtain thermally expandable MSs having particularly excellent processability, foamability, and gas barrier properties, a (meth)acrylonitrile (co)polymer obtained by polymerizing polymerizable monomers (total amount is 100 mass %) containing from 70 to 99.5 mass % of a nitrile monomer that is (meth)acrylonitrile and from 0.5 to 30 mass % of another vinyl monomer is preferred.

The proportion of the nitrile monomer that is (meth) acrylonitrile in the polymerizable monomers (total amount is 100 mass %) is preferably from 80 to 99.5 mass %, more preferably from 85 to 99.5 mass %, even more preferably from 90 to 99.5 mass %, particularly preferably from 95 to 99.5 mass %, and most preferably from 97 to 99.5 mass %. The proportion of another vinyl monomer is preferably from 0.5 to 20 mass %, more preferably from 0.5 to 15 mass %, even more preferably from 0.5 to 10 mass %, particularly preferably from 0.5 to 5 mass %, and most preferably from 0.5 to 3 mass %. The mass ratio of acrylonitrile/methacrylonitrile in the (meth)acrylonitrile (co)polymer is from 100/0 to 20/80, preferably from 95/5 to 40/60, more preferably from 90/10 to 50/50, and even more preferably from 85/15 to 55/45. That is, by mainly using a (meth)acrylonitrile (co)polymer having a high softening point due to strong intermolecular force of the nitrile group, complex effect on the thermally expandable MSs caused by component factors is readily obtained. As a result, thermally expandable MSs that have a high foaming initiation temperature, a high expansion ratio, and little sag can be produced.

As another vinyl monomer, although acrylate and methacrylate, and in particular methyl methacrylate, are preferred, various vinyl monomers described above other than these can be also used.

(2) Crosslinkable Monomer

In the present invention, a crosslinkable monomer is used together with the polymerizable monomers described above. The type and/or used amount of the crosslinkable monomer significantly affects the of the nitrile monomer that is (meth) acrylonitrile of the polymerizable monomers forming the outer shell polymer described above, mass ratio of acrylonitrile/methacrylonitrile, conditions of foaming agent described below, and/or the like, thereby achieving complex effects and making it possible to enhance processability, foaming characteristics, heat resistance, and the like as well as to enhance expansion ratio and reduce sag. As the crosslinkable monomer, a polyfunctional compound having at least two polymerizable carbon-carbon double bonds (—C═C—) is used. Examples of the polymerizable carbon-carbon double bonds include vinyl groups, methacryl groups, acryl groups, and allyl groups. At least two polymerizable carbon-carbon double bonds may be the same or different from each other.

Among the crosslinkable monomers, from the perspectives of elasticity of the outer shell polymer and ease in maintaining good balance between foamability and processability, a bifunctional crosslinkable monomer having two polymerizable carbon-carbon double bonds is preferred. Examples thereof include bifunctional crosslinkable monomers including aromatic divinyl compounds, such as divinylbenzene, divinylnaphthalene, and derivatives thereof; diethylenically unsaturated carboxylic esters, such as ethylene glycol diacrylate, diethylene glycol diacrylate, ethylene glycol dimethacrylate, and diethylene glycol dimethacrylate; acrylates or methacrylates derived from alcohols having aliphatic groups at both terminals, such as 1,4-butanediol and 1,9-nonanediol; and divinyl compounds, such as N,N-divinylaniline and divinyl ether.

Furthermore, as the bifunctional crosslinkable monomer, a bifunctional crosslinkable monomer having a structure in which two polymerizable carbon-carbon double bonds are linked via a flexible chain is preferred.

Examples of the bifunctional crosslinkable monomer having a structure in which two polymerizable carbon-carbon double bonds are linked via a flexible chain include polyethylene glycol diacrylate, polyethylene glycol dimethacrylate, polypropylene glycol diacrylate, polypropylene glycol dimethacrylate, alkyldiol diacrylates, alkyldiol dimethacrylates, alkyl ether diol diacrylates, alkyl ether diol dimethacrylates, alkyl ester diol diacrylates, alkyl ester diol dimethacrylates, and mixtures of two or more types of these.

Examples of the preferred crosslinkable monomer include polyethylene glycol diacrylate, polyethylene glycol dimethacrylate, and polypropylene glycol diacrylate. Among these, diethylene glycol diacrylate and diethylene glycol dimethacrylate are preferred.

When a bifunctional crosslinkable monomer having such a flexible chain is used as the crosslinkable monomer, the temperature dependence of the elastic modulus of the outer shell polymer can be made small while the expansion ratio is maintained at a high level. In addition, thermally expandable MSs, in which the outer shell is difficult to break and the encapsulated gas is less likely to escape even when shear force is applied during a processing step, such as a kneading process, calendering process, extrusion process, or injection molding, can be obtained.

To make the outer shell polymer possible to correspond to a high expansion ratio, the used proportion of the crosslinkable monomer needs to be precisely adjusted. The used proportion is from 0.9 to 1.4 parts by mass, preferably from 0.95 to 1.3 parts by mass, and more preferably from 1.0 to 1.2 parts by mass, per 100 parts by mass of the polymerizable monomers. When the used proportion of the crosslinkable monomer is outside the range described above, complex effect on the thermally expandable MSs caused by component factors is less likely to be achieved as intended.

(3) Foaming Agent

In the present invention, a mixed foaming agent containing an isododecane isomer mixture and an isooctane isomer mixture is employed as the foaming agent. Furthermore, in the present invention, the foaming agent preferably employs a mixed foaming agent A formed from an isododecane isomer mixture and an isooctane isomer mixture or a mixed foaming agent B formed from an isododecane isomer mixture, isooctane isomer mixture, and a saturated hydrocarbon having 7 or less carbons.

When foaming at high temperatures is intended, the mixed foaming agent A is used, and when a particularly high expansion ratio is intended, the mixed foaming agent B is used.

Furthermore, when the total amount of the foaming agent is 100 mass %, a mixed foaming agent A including from 50 to 75 mass % of the isododecane isomer mixture and from 25 to 50 mass % of the isooctane isomer mixture or, a mixed foaming agent B including from 45 to 55 mass % of the isododecane isomer mixture and from 30 to 41.5 mass % of the isooctane isomer mixture as main components, and from 3.5 to 25 mass % of the saturated hydrocarbon having 7 or less carbons as the other component is used.

In the mixed foaming agent B, since the saturated hydrocarbon having 7 or less carbons as the other component is not a main component, when the content ratio of the mixed foaming agent B is decided, the total amount of the foaming agent is first decided, then the amount of the isododecane isomer mixture and the amount of the isooctane isomer mixture are selected from the range of 45 to 55 mass % and the range of 30 to 41.5 mass %, respectively, out of the total amount, and then the amount of the saturated hydrocarbon having 7 or less carbons as the other component is decided.

With the mixed foaming agent B, it is conceived that, since the saturated hydrocarbon having 7 or less carbons typically has a boiling point that is lower than the boiling point of isooctane, the saturated hydrocarbon permeates the outer shell polymer and plasticize the outer shell in a large degree, thereby making the expansion ratio high.

The isododecane isomer mixture may be a mixture of isomers of isododecane as long as isododecane is contained, and may be isododecane alone (when the total amount of the isododecane isomer mixture is 100 mass %, 100 mass % of isododecane). The isomer of isododecane is composed of saturated hydrocarbons of $C_{12}H_{26}$.

Note that the isododecane isomer mixture may contain a saturated hydrocarbon having 13 or more carbons, and when the total amount of the isododecane isomer mixture is 100 mass %, the isododecane isomer mixture may contain from 0 to 12 mass %, preferably from 0 to 11 mass %, and more preferably from 0 to 10 mass %, of the saturated hydrocarbon having 13 or more carbons. In this case, the saturated hydrocarbon having 13 or more carbons often be a saturated hydrocarbon having a boiling point that is higher than the boiling point of isododecane. Practically, in this saturated hydrocarbon, the number of carbons is 13 or more but, from the perspective of melting point of the outer shell polymer, the number of carbons is approximately at most 16, which results in a boiling point of 200° C. level.

The isododecane is also called 2,2,4,6,6-pentamethylheptane, and since the isododecane has a high boiling point of 177° C. and has a bulky structure compared to structures of hydrocarbons having linear structures, it is difficult for gas to escape through the outer shell after the foaming and thus is preferred.

The isooctane isomer mixture may be a mixture of isomers of isooctane as long as isooctane is contained, and may be isooctane alone (when the total amount of the isooctane isomer mixture is 100 mass %, 100 mass % of isooctane). Note that the isomer of isooctane is composed of saturated hydrocarbons of $C_8H_{18}$.

Note that the isooctane isomer mixture may contain a saturated hydrocarbon having from 9 to 11 carbons, and when the total amount of the isooctane isomer mixture is 100 mass %, the isooctane isomer mixture may contain from 0 to 20 mass %, preferably from 0 to 17 mass %, and more preferably from 0 to 15 mass %, of the saturated hydrocarbon having from 9 to 11 carbons. The isooctane is also called 2,2,4-trimethylpentane, and the boiling point thereof is 99.25° C.

Examples of the saturated hydrocarbon having 7 or less carbons include hydrocarbons, such as ethane, ethylene, propane, propene, n-butane, isobutane, butene, isobutene, n-pentane, isopentane, neopentane, n-hexane, isohexane, n-heptane, and cyclohexane, and isomer mixtures of these hydrocarbons.

Among these, isopentane is preferred. The isopentane is also called 2-methylbutane ($C_5H_{12}$), and the boiling point thereof is 27.7° C. Furthermore, isopentane isomer mixture is also preferred.

The isopentane isomer mixture may be a mixture of isomers of isopentane as long as isopentane is contained, and may be isopentane alone (when the total amount of the isopentane isomer mixture is 100 mass %, 100 mass % of isooctane). Note that the isomer of isopentane is composed of saturated hydrocarbons of $C_5H_{12}$.

Note that the isopentane isomer mixture may contain saturated hydrocarbon having from 6 to 7 carbons, and when the total amount of the isopentane isomer mixture is 100 mass %, the isopentane isomer mixture may contain from 0 to 20 mass %, preferably from 0 to 17 mass %, and more preferably from 0 to 15 mass %, of the saturated hydrocarbon having from 6 to 7 carbons.

By the mixed foaming agent of the present invention, internal pressure (vapor pressure due to foaming agent) during the foaming can be controlled, and good balance of foamability and processability at high temperatures can be achieved and the foaming temperature range can be easily controlled.

As the mixed foaming agent A, when the total amount of the foaming agent is 100 mass %, a mixed foaming agent A including from 50 to 75 mass % of the isododecane isomer mixture and from 25 to 50 mass % of the isooctane isomer mixture, preferably from 52 to 73 mass % of the isododecane isomer mixture and from 27 to 48 mass % of the isooctane isomer mixture, and more preferably from 53 to 70 mass % of the isododecane isomer mixture and from 30 to 47 mass % of the isooctane isomer mixture, is used.

As the mixed foaming agent B, when the total amount of the foaming agent is 100 mass %, a mixed foaming agent B including from 45 to 55 mass % of the isododecane isomer mixture and from 30 to 41.5 mass % of the isooctane isomer mixture as main components, and from 3.5 to 25 mass % of the saturated hydrocarbon having 7 or less carbons as the other component is used. Preferably, the mixed foaming agent B includes from 46 to 54 mass % of the isododecane isomer mixture and from 32 to 41 mass % of the isooctane isomer mixture as main components, and from 5 to 22 mass % of the saturated hydrocarbon having 7 or less carbons as the other component. More preferably, the mixed foaming agent B includes from 47 to 53.5 mass % of the isododecane isomer mixture and from 33 to 41 mass % of the isooctane isomer mixture as main components, and from 5.5 to 20 mass % of the saturated hydrocarbon having 7 or less carbons as the other component.

The proportion of the foaming agent encapsulated in the thermally expandable MSs is typically from 20 to 40 parts by mass, preferably from 22 to 38 parts by mass, more preferably from 25 to 35 parts by mass, particularly preferably from 27 to 33 parts by mass, and even more preferably from 28 to 32 parts by mass, per 100 parts by mass of the polymerizable monomers. When the content of the foaming agent is too small, the expansion ratio becomes insufficient, and when the content is too large, the thickness of the outer shell becomes too thin and early foaming and breakage of the outer shell tend to occur when shear force is applied while being heated during processing.

(4) Method of Producing Thermally Expandable MSs

The thermally expandable MSs of the present invention can be produced by a method in which at least one type of the polymerizable monomers and the foaming agent are subjected to suspension polymerization in an aqueous dispersion medium containing a dispersion stabilizer. The polymerizable monomer mixture containing at least the polymerizable monomers and the foaming agent is dispersed in the aqueous dispersion medium to form oily droplets of the polymerizable monomer mixture. The formation of the droplets of the polymerizable monomer mixture is also called granulation. After the droplet formation, the polymerization of the polymerizable monomers is performed using a polymerization initiator. By the suspension polymerization, thermally expandable MSs having a structure in which a foaming agent is encapsulated in an outer shell formed from the produced polymer can be obtained.

The amount of water in the aqueous dispersion medium (the amount that is mixed as water in the initial stage of preparation of the aqueous dispersion medium) is from 100 to 500 parts by mass, preferably from 140 to 400 parts by mass, more preferably from 170 to 350 parts by mass, and particularly preferably from 180 to 300 parts by mass, per 100 parts by mass of the polymerizable monomers.

As the polymerization initiator, one that is generally used in this technical field may be used, but an oil-soluble polymerization initiator that is soluble in the polymerizable monomer is preferred. Specific examples of the polymerization initiator include dialkyl peroxides, such as methyl ethyl peroxide; diacyl peroxide, such as isobutyl peroxide; peroxyesters, such as t-butyl peroxypivalate; peroxydicarbonates, such as bis(4-t-butylcyclohexyl) peroxydicarbonate; and azo compounds, such as 2,2'-azobisisobutyronitrile.

Among these, an azo compound, such as 2,2'-azobisisobutyronitrile, is preferred.

Although the polymerization initiator is typically contained in the polymerizable monomer mixture, when early polymerization needs to be suppressed, a part or all of the polymerization initiator may be added to an aqueous dispersion medium during the droplet formation step or after the droplet formation step of the polymerizable monomer mixture to transfer the polymerization initiator into the droplets of polymerizable monomer mixture.

The used proportion of the polymerization initiator is typically from 0.0001 to 3 parts by mass, preferably from 0.001 to 2 parts by mass, more preferably from 0.01 to 1.5 parts by mass, even more preferably from 0.1 to 1.2 parts by mass, and most preferably from 0.5 to 1.1, per 100 parts by mass of the polymerizable monomers.

The suspension polymerization is typically performed in an aqueous dispersion medium containing a dispersion stabilizer. Examples of the dispersion stabilizer include inorganic microparticles of silica or the like. For example, as a co-stabilizer, condensation products of diethanolamine and aliphatic dicarboxylic acid, polyvinylpyrrolidone, polyethylene oxide, and various emulsifiers can be used.

The aqueous dispersion medium containing the dispersion stabilizer is typically prepared by compounding a dispersion stabilizer and a co-stabilizer in deionized water. The pH of the aqueous phase during polymerization can be appropriately decided depending on the types of used dispersion stabilizer and co-stabilizer. For example, when silica, such as colloidal silica, is used as a dispersion stabilizer, the polymerization is performed in an acidic environment. To make the aqueous dispersion medium acidic, an acid is added to the aqueous dispersion medium as needed to adjust the pH of the reaction system to 6 or lower, preferably from 3 to 4, more preferably from 3.3 to 4, and most preferably from 3.4 to 4.

One of the preferable combination of dispersion stabilizers is a combination of colloidal silica and a condensation product. As the condensation product, a condensation product of diethanolamine and aliphatic dicarboxylic acid is preferred, and a condensation product of diethanolamine and adipic acid or a condensation product of diethanolamine and itaconic acid is particularly preferred. Among these, a condensation product of diethanolamine and adipic acid is the most preferred.

The acid value of the condensation product (mg/KOHg) is preferably 60 or greater but less than 95, more preferably from 65 to 90, even more preferably from 70 to 85, and most preferably from 75 to 80.

The used proportion of the condensation product is from 0.01 to 2 parts by mass, preferably from 0.05 to 1.5 parts by mass, more preferably from 0.07 to 1 part by mass, even more preferably from 0.1 to 0.7 parts by mass, particularly preferably from 0.2 to 0.45 parts by mass, and most preferably from 0.2 to 0.40 parts by mass, per 100 parts by mass of the polymerizable monomers.

Furthermore, when an inorganic salt, such as sodium chloride and sodium sulfate, is added, the thermally expandable MSs having even more uniform particle shape tend to be obtained. As the inorganic salt, typically, sodium chloride is preferably used.

The used proportion of the inorganic salt is from 50 to 150 parts by mass, preferably from 60 to 130 parts by mass, and more preferably from 70 to 110 parts by mass, per 100 parts by mass of the polymerizable monomers.

The used amount of the colloidal silica is smaller than typical amount in order to increase the particle size thereof. This is because the surface area of the thermally expandable MS per volume becomes smaller when the particle size thereof is greater, thereby reducing the amount of colloidal silica needed to cover the surface thereof.

The used proportion of the colloidal silica is from 0.3 to 6 parts by mass, preferably from 0.5 to 5 parts by mass, more preferably from 0.6 to 4 parts by mass, even more preferably from 0.68 to 3.9 parts by mass, particularly preferably from 0.67 to 3.7 parts by mass, and most preferably from 0.65 to 3.6 parts by mass, per 100 parts by mass of the polymerizable monomers.

Examples of other preferable combinations of the dispersion stabilizer include combinations of colloidal silica and water-soluble nitrogen-containing compound. Among these, a combination of colloidal silica and polyvinylpyrrolidone is preferred.

Although an emulsifier is typically not used, as desired, an anionic surfactant, such as dialkyl sulfosuccinates or phosphates of polyoxyethylenealkyl(allyl)ether, may be used.

As a polymerization aid, at least one type of compounds selected from the group consisting of alkali metal nitrite, tin(II) chloride, tin(IV) chloride, water-soluble ascorbic acids, and boric acid may be present in the aqueous dispersion medium. When suspension polymerization is performed in the presence of these compounds, aggregation of polymer particles does not occur during the polymerization, and the polymerized product does not adhere to the wall of the polymerization vessel, thereby making it possible to stably produce the thermally expandable MSs while the heat build-up due to the polymerization is efficiently eliminated.

Among the alkali metal nitrites, the sodium nitrite and potassium nitrite are preferred from the perspectives of availability and cost. Examples of the ascorbic acids include ascorbic acid, metal salts of ascorbic acid, and esters of ascorbic acid. Among these, water-soluble ascorbic acids are preferred. Note that the water-soluble ascorbic acids refer to those having a solubility of at least 1 g/100 cm$^3$ in water at 23° C. Among these, L-ascorbic acid (vitamin C), sodium ascorbate, and potassium ascorbate are particularly preferably used from the perspectives of availability, cost, and action and effect. These compounds are used in a proportion of typically from 0.001 to 1 part by mass, and preferably from 0.01 to 0.1 parts by mass, per 100 parts by mass of the polymerizable monomers.

The order of adding the components to the aqueous dispersion medium is optional. However, water and the dispersion stabilizer, and optionally the co-stabilizer, polymerization aid, and the like are generally added to prepare an aqueous dispersion medium containing the dispersion stabilizer. The foaming agent, polymerizable monomers (vinyl monomer) and crosslinkable monomer may be added separately to the aqueous dispersion medium to combine them in the aqueous dispersion medium, thereby forming a polymerizable monomer mixture (oily mixture). However, these components are generally mixed in advance, and the resulting mixture is then added into the aqueous dispersion medium. The polymerization initiator may be used to be added in the polymerizable monomers in advance. However, when early polymerization needs to be avoided, for example, the polymerizable monomer mixture may be added to the aqueous dispersion medium, and the polymerization initiator may be then added with stirring to combine them in the aqueous dispersion medium. The mixing of the polymerizable monomer mixture with the aqueous dispersion medium may be conducted in a separate container to stir and mix the resultant mixture in a stirring machine or dispersing machine having high shearing force, and the mixture may be then charged into a polymerization vessel (hereinafter, also referred to as "reaction vessel").

By stirring and mixing the polymerizable monomer mixture and the aqueous dispersion medium, droplets of the polymerizable monomer mixture is formed in the aqueous dispersion medium. The average particle size of the droplets is almost the same as the target average particle size of the thermally expandable MSs and is from 40 to 200 µm, preferably from 43 to 200 µm, and particularly preferably from 45 to 200 µm. To obtain the thermally expandable MSs having extremely sharp particle size distribution, it is preferable to employ a method, in which the aqueous dispersion medium and the polymerizable monomer mixture are fed into a continuous high-speed rotation and high-shearing type stirring and dispersing machine, both components are continuously stirred and dispersed by the stirring and dispersing machine, the resultant dispersion is poured into a reaction vessel, and suspension polymerization is conducted in the polymerization vessel.

The suspension polymerization is typically performed by degassing the reaction vessel or purging an inert gas in the reaction vessel and by increasing the temperature to 30 to 100° C. In the suspension polymerization, the polymerization temperature may be controlled to a constant temperature or may be increased step-wise. After the suspension polymerization, the reaction mixture containing the produced thermally expandable MSs is treated by a method, such as filtration, centrifugal separation, or precipitation, to separate the thermally expandable MSs from the reaction mixture. After the separated thermally expandable MSs are washed and filtered, the thermally expandable MSs are collected as a wet cake. As necessary, the thermally expandable MSs are dried at a relatively low temperature that does not initiate foaming.

The thermally expandable MSs obtained as described above can be subjected to surface treatment using various compounds as desired. Furthermore, adhering inorganic microparticles on the surfaces of the thermally expandable MSs can prevent aggregation of the particles. Furthermore, the surfaces of the thermally expandable MSs can be coated with various materials.

The average particle size of the thermally expandable MSs can be adjusted by various factors such as dispersion by a continuous high-speed rotation and high-shearing type stirring and dispersing machine, and the amount of colloidal silica.

The method of producing the thermally expandable MSs of the present invention aims at producing the thermally expandable MSs having a large average particle size.

Therefore, by reducing the amounts of colloidal silica and/or condensation product, polymerization conditions that can easily produce the thermally expandable MSs having a large average particle size are found out and employed.

The preferred production method is a production method including steps (i) to (iii) below: (i) preparing an aqueous dispersion medium containing from 0.3 to 6 parts by mass of colloidal silica, a condensation product, water, an inorganic salt, and alkali metal nitrite per 100 parts by mass of the polymerizable monomers; (ii) preparing a polymerizable monomer mixture containing at least one type of nitrile monomer selected from the group consisting of acrylonitrile and methacrylonitrile as a main component and another vinyl monomer that is not methacrylic acid and that is copolymerizable with the nitrile monomer, from 0.9 to 1.4 parts by mass of a crosslinkable monomer, and from 20 to 40 parts by mass of a mixed foaming agent containing an isododecane isomer mixture and an isooctane isomer mixture, per 100 parts by mass of the polymerizable monomers; and (iii) stirring and mixing the aqueous dispersion medium and the polymerizable monomer mixture to perform suspension polymerization.

Furthermore, by investigating the aqueous dispersion medium and by reducing the amount of water, polymerization conditions that can easily produce the thermally expandable MSs having a large average particle size is prepared.

The production method includes steps (i) to (iii) below: (i) preparing an aqueous dispersion medium containing colloidal silica in a proportion of 0.3 to 6 parts by mass, a condensation product, water in an amount of 100 to 500 parts by mass, an inorganic salt, and alkali metal nitrite per 100 parts by mass of the polymerizable monomers; (ii) preparing a polymerizable monomer mixture containing at least one type of nitrile monomer selected from the group consisting of acrylonitrile and methacrylonitrile as a main component and another vinyl monomer that is not methacrylic acid and that is copolymerizable with the nitrile monomer, from 0.9 to 1.4 parts by mass of a crosslinkable monomer, and from 20 to 40 parts by mass of a mixed foaming agent containing an isododecane isomer mixture and an isooctane isomer mixture, per 100 parts by mass of the polymerizable monomers; and (iii) stirring and mixing the aqueous dispersion medium and the polymerizable monomer mixture to perform suspension polymerization.

Most preferably, the polymerization conditions, including the polymerization initiator and the like, are precisely specified.

The most preferable production method is a production method includes steps (i) to (iii) below: (i) preparing an aqueous dispersion medium containing colloidal silica in a proportion of 0.3 to 6 parts by mass, from 0.01 to 2 parts by mass of a condensation product that has an acid value of 60 to 95, from 100 to 500 parts by mass of water, from 50 to 150 parts by mass of an inorganic salt, and from 0.001 to 1 part by mass of alkali metal nitrite per 100 parts by mass of the polymerizable monomers; (ii) preparing a polymerizable monomer mixture containing at least one type of nitrile monomer selected from the group consisting of acrylonitrile and methacrylonitrile as a main component and another vinyl monomer that is not methacrylic acid and that is copolymerizable with the nitrile monomer, from 0.9 to 1.4 parts by mass of a crosslinkable monomer, and from 20 to 40 parts by mass of a mixed foaming agent containing an isododecane isomer mixture and an isooctane isomer mixture, per 100 parts by mass of the polymerizable monomers; and (iii) stirring and mixing the aqueous dispersion medium and the polymerizable monomer mixture to perform suspension polymerization.

(5) Thermally Expandable MS

The thermally expandable MSs of the present invention have a structure in which a foaming agent is encapsulated in an outer shell formed from a polymer.

The average particle size of the thermally expandable MSs of the present invention is from 40 to 200 µm, preferably from 43 to 200 µm, and particularly preferably from 45 to 200 µm. When the average particle size of the thermally expandable MSs is too small, foamability becomes insufficient. The case where the average particle size of the thermally expandable MSs is too large may not be preferable in the field where excellent appearance is required since smoothness of the surface is impaired.

In the present invention, since a foaming agent containing hydrocarbon having a high boiling point is used, in the case of thermally expandable MSs that has not undergone heat treatment, the thermally expandable MSs having the foaming initiation temperature by TMA measurement of 190° C. or higher, preferably 191° C. or higher, and more preferably 192° C. or higher, can be obtained. The upper limit of the foaming initiation temperature is approximately 230° C.

As described above, since the thermally expandable MSs of the present invention can increase the foaming initiation temperature, undesired early foaming can be suppressed even when thermal history at high temperatures is added when the thermally expandable MSs are mixed with a synthetic resin, a rubber, a binder resin, and the like. The thermally expandable MSs of the present invention can be formed into pellets containing unfoamed thermally expandable MSs by, for example, being melt-extruded with various thermoplastic resins. Accordingly, with the thermally expandable MSs of the present invention, a wider variety of types of polymer materials and the like can be used.

The thermally expandable MSs of the present invention have excellent processability at high temperatures before being foamed; however, the foaming initiation temperature becomes higher. For some fields of usage, low foaming initiation temperatures are desired. By being heat-treated in advance, the thermally expandable MSs of the present invention can make the foaming initiation temperature significantly lower. For example, in processing fields where the thermally expandable MSs of the present invention are mixed with a polymer material, such as a synthetic resin or a rubber, unexpected foaming due to thermal history during processing steps has been a problem; however, by making the foaming initiation temperature high, this problem can be solved, and the foaming initiation temperature can be lowered by the thermal history during the processing. Furthermore, even when thermal history is added during processing, the foaming initiation temperature thereafter is lowered with the thermally expandable MSs of the present invention.

The heat treatment of the thermally expandable MSs is preferably performed at equal to or lower than the boiling point of hydrocarbon having a high boiling point, and is performed in heat treatment conditions at typically from 100 to 175° C., and more preferably from 110 to 175° C., for 10 seconds to 10 minutes, preferably 30 seconds to 7 minutes, and particularly preferably 1 to 5 minutes. When the heat treatment temperature is high, the heat treatment time is preferably set to be short, and when the heat treatment temperature is low, the heat treatment time is preferably set to be long.

For example, the heat treatment at 150° C. for 5 minutes can lower the foaming initiation temperature to typically 175° C. or lower, preferably 173° C. or lower, and particularly preferably 171° C. or lower. As described above, with the thermally expandable MSs of the present invention, the foaming initiation temperature can be set to 190° C. or higher; however, for example, the foaming initiation temperature can be lowered to 175° C. or lower by 5 minutes of heat treatment at 150° C. In the case of performing 5 minutes of heat treatment at 150° C., the highest foaming temperature is 180° C. or higher, preferably 183° C. or higher, and more preferably 186° C. or higher.

Preferably, the thermally expandable MSs of the present invention preferably have a foaming initiation temperature after the heat treatment for 5 minutes at 150° C. of 175° C. or lower and a highest foaming temperature after the heat treatment for 5 minutes at 150° C. of 180° C. or higher.

As is also clear from the expansion ratio when 5 minutes of heat treatment at 150° C. and then 2 minutes of foaming by heating at 200° C. was performed (R1) is 68 in Example 1 and 88 in Example 2 described below, the expansion ratio of the thermally expandable MSs of the present invention is 60 or greater. As is clear from the expansion ratio when 5 minutes of heat treatment at 150° C. and then 4 minutes of foaming by heating at 200° C. was performed (R2) is 83 in Example 1 and 103 in Example 2 described below, the expansion ratio of the thermally expandable MSs of the present invention is 70 or greater.

The expansion ratio can be decided based on the size of the article containing the foamed particles and the purpose thereof. When the expansion ratio is increased too high, in the case of molded article containing the foamed particles, mechanical strength thereof tends to be insufficient due to the too large size of the foamed particles.

Furthermore, in the thermally expandable MSs of the present invention, if the expansion ratio after the thermally expandable microspheres have been heat-treated for 5 minutes at 150° C. and then foamed by heating for 2 minutes at 200° C. is denoted as R1, and the expansion ratio after the thermally expandable microspheres have been heat-treated for 5 minutes at 150° C. and then foamed by heating for 4 minutes at 200° C. is denoted as R2, the ratio (%) expressed by the formula $(R2/R1) \times 100$ is a high value of 105% or greater, preferably 110% or greater, and more preferably 115% or greater, as is also clear from 122% in Example 1 and 117% in Example 2 described below. This value of 105% or greater indicates that occurrence of sag is little even at high temperatures.

In Patent Document 5, if the expansion ratio after the thermally expandable microspheres have been heat-treated for 2 minutes at 170° C. and then foamed by heating for 2 minutes at 200° C. is denoted as Ra, and the expansion ratio after the thermally expandable microspheres have been heat-treated for 2 minutes at 170° C. and then foamed by heating for 4 minutes at 200° C. is denoted as R2, when calculated based on the table, the ratio (%) expressed by the formula $(R2/Ra) \times 100$ is 86% in Example 1, 87% in Example 2, and 79% in Example 3. That is, Patent Document 5 cannot achieve 90% or greater.

In this case, heat treatment at 150° C. is important. That is, this indicates that the heat treatment temperature is lower and the thermally expandable MSs can be applied for a wider variety of use as products compared to the case of heat treatment at 170° C. described in Patent Document 5.

(6) Application

The thermally expandable MSs of the present invention can be used in a variety of fields by being foamed by heating (thermal expansion) or without being foamed. For example, the thermally expandable MSs are used in fillers for coating materials for automobiles and the like, foaming agents (thermally expandable foaming agents) for wallpapers and foaming inks (for applying relief patterns to T-shirts and the like), shrink preventing agents, and the like by utilizing the expanding ability thereof.

The thermally expandable MSs of the present invention are used for the purpose of reducing weights of polymer materials such as synthetic resins (thermoplastic resins and thermosetting resins) and rubbers, coating materials, various materials, and the like, making them porous, and imparting various functionalities (e.g. slip property, heat insulating property, cushioning property, and sound insulating property) by utilizing volume increase by foaming. Examples of the polymer material include polyethylene, polypropylene, polystyrene, ABS resins, SBS, SIS, hydrogenated SBS, hydrogenated SIS, natural rubber, various kinds of synthetic rubbers, and thermoplastic polyurethane.

That is, according to the present invention, a composition containing the thermally expandable MSs of the present invention and at least one type of polymer material can be provided. Furthermore, since fibrous substances do not have functionality to retain air therein by themselves, thermally expandable MSs, which are closed cells, are suitable. That is, the thermally expandable MSs are used in fibrous substances (e.g. glass fibers, kenaf, and carbon fibers).

The thermally expandable MSs of the present invention which have a high expansion ratio and can achieve particular design effect can be also used in the fields of coating materials, wallpapers, and inks. Since the thermally expandable MSs of the present invention are excellent in processability, the thermally expandable MSs may be suitably applied to the fields of use which requires a processing step such as a kneading process, calendering process, extrusion process, or injection molding.

As described above, the thermally expandable MSs of the present invention can be used as foaming agents or mixed with polymer materials to form compositions. The thermally expandable MSs of the present invention can be melt-kneaded together with thermoplastic resins as they are kept unfoamed to form pellets. The thermally expandable MSs of the present invention can be incorporated into polymer materials, coating materials, inks and the like and heated and foamed to provide articles containing foamed particles (e.g. foam molded articles, foam coated films, foamed inks, and fibrous substances). Furthermore, according to the present invention, an article containing foamed particles obtained by heating and foaming the thermally expandable MSs of the present invention can be provided.

An embodiment of the present invention may have the following configurations.

[1] A thermally expandable microsphere having a structure in which a foaming agent is encapsulated in an outer shell formed from a polymer,
the outer shell being formed from (meth)acrylonitrile (co) polymer obtained by polymerizing polymerizable monomers and a crosslinkable monomer;
the polymerizable monomers being at least one type of nitrile monomer selected from the group consisting of acrylonitrile and methacrylonitrile as a main component and another vinyl monomer that is not methacrylic acid and that is copolymerizable with the nitrile monomer;
an amount of the crosslinkable monomer being from 0.9 to 1.4 parts by mass per 100 parts by mass of the polymerizable monomers;
the foaming agent being a mixed foaming agent containing an isododecane isomer mixture and an isooctane isomer mixture; and
a ratio (%) of (R2/R1)×100 being at least 105%, where R1 is an expansion ratio after the thermally expandable microsphere has been heat-treated for 5 minutes at 150° C. and then foamed by heating for 2 minutes at 200° C., and R2 is an expansion ratio after the thermally expandable microsphere has been heat-treated for 5 minutes at 150° C. and then foamed by heating for 4 minutes at 200° C.

[2] The thermally expandable microsphere according to [1], where the foaming agent further contains a saturated hydrocarbon having 7 or less carbons.

[3] The microsphere according to [1], where the foaming agent includes from 50 to 75 mass % of the isododecane isomer mixture and from 25 to 50 mass % of the isooctane isomer mixture.

[4] The thermally expandable microsphere according to [2], where the foaming agent includes from 45 to 55 mass % of the isododecane isomer mixture, from 30 to 41.5 mass % of the isooctane isomer mixture, and from 3.5 to 25 mass % of the saturated hydrocarbon having 7 or less carbons.

[5] The thermally expandable microsphere according to [2] or [4], where the saturated hydrocarbon having 7 or less carbons is an isopentane isomer mixture.

[6] The thermally expandable microsphere according to any one of [1] to [5], where the polymerizable monomers are at least one type of nitrile monomer selected from the group consisting of acrylonitrile and methacrylonitrile as a main component and another vinyl monomer that is not a vinyl monomer having a carboxyl group and that is copolymerizable with the nitrile monomer.

[7] The thermally expandable microsphere according to any one of [1] to [6], where the R1 is 60 or greater.

[8] The thermally expandable microsphere according to any one of [1] to [7], where a foaming initiation temperature after the heat treatment for 5 minutes at 150° C. is 175° C. or lower.

[9] A composition including the thermally expandable microsphere described in any one of [1] to [8], and at least one type of polymer material.

[10] A molded article including a foamed particle obtained by foaming the thermally expandable microsphere described in any one of [1] to [8].

EXAMPLES

The present invention will be more specifically described hereinafter with reference to examples and comparative examples.

Measurement Method (1) Foaming Initiation Temperature and Highest Foaming Temperature TMA measurement was performed using TMA/SDTA840, manufactured by Mettler Toledo. Using approximately 0.25 mg of a sample, foaming behavior was observed by increasing the temperature at 5° C./min. More specifically, a sample (thermally expandable MSs) was placed in a container, and the temperature thereof was increased at 5° C./min to continuously measure the displacement in the height thereof. The temperature at which the displacement in height of the sample in the container started was used as the foaming initiation temperature (Ts), and the temperature at which the height reached its maximum height was used as the highest foaming temperature ($T_{max}$).

(2) Expansion Ratio

In a Geer oven, 0.7 g of thermally expandable MSs was placed and foamed by heating for 2 minutes at a predetermined temperature (foaming temperature). The obtained foamed bodies were placed in a graduated cylinder to measure the volume, and the expansion ratio was calculated by dividing the volume of the foamed bodies by the volume of the thermally expandable MSs prior to the foaming. The expansion ratio was measured for the sample undergone 5 minutes of heat treatment at 150° C.

(3) Average Particle Size

The particle size distribution of the thermally expandable MSs was measured using a particle size distribution analyzer FPIA-3000, manufactured by Sysmex Corporation, and the average particle size (μm) was expressed using the median size.

Example 1

(1) Preparation of Aqueous Dispersion Medium

An aqueous dispersion medium was prepared by mixing 15 g of 20 mass % colloidal silica, 0.7 g of 50 mass % diethanolamine-adipic acid condensation product (acid value: 78 mgKOH/g), 0.06 g of sodium nitrite, 89 g of sodium chloride, and 267 g of water. Hydrochloric acid was added to this aqueous dispersion medium to adjust the pH to 3.5.

(2) Preparation of Polymerizable Mixture

A polymerizable monomer mixture was prepared by mixing 67 g of acrylonitrile, 31 g of methacrylonitrile, 2 g of methyl methacrylate, 1.1 g of diethylene glycol dimethacrylate, 16 g of isododecane, 14 g of isooctane, and 1.0 g of 2,2'-azobisisobutyronitrile.

(3) Suspension Polymerization

The prepared aqueous dispersion medium and polymerizable mixture were stirred and mixed using a homogenizer to form minute droplets of the polymerizable monomer mixture in the aqueous dispersion medium. By charging the aqueous dispersion medium containing minute droplets of this polymerizable monomer mixture into a polymerization vessel (1.5 L) equipped with an agitator to perform reaction by using a hot water bath at 60° C. for 15 hours and then heating at 70° C. for 10 hours. After the polymerization, the slurry containing the produced thermally expandable MSs was filtered, washed with water, and then dried to obtain thermally expandable MSs having an average particle size of 49 μm.

(4) Foamability Evaluation

Using the thermally expandable MSs obtained as described above as is as a sample (non-heat-treated sample), TMA measurement was performed, and the foaming initiation temperature was 215° C. When the thermally expandable MSs were subjected to TMA measurement after being heat-treated at 150° C. for 5 minutes, the foaming initiation temperature was 169° C. and the highest foaming temperature was 188° C.

The expansion ratio R1 when the thermally expandable MSs had been heat-treated for 5 minutes at 150° C. and then foamed by heating for 2 minutes at 200° C. was 68, and the expansion ratio R2 when the thermally expandable MSs had been heat-treated for 5 minutes at 150° C. and then heated for 4 minutes at 200° C. was 83. The ratio of the expansion ratio R2 after being heated for 4 minutes relative to the expansion ratio R1 after being heated for 2 minutes [(R2/R1)×100] was determined, and the ratio was 122%.

Example 2

Thermally expandable MSs having an average particle size of 47 μm were obtained by performing suspension polymerization in the same manner as in Example 1 except for changing the amount of the diethylene glycol dimethacrylate of the crosslinkable monomer to 1.0 g and changing the foaming agent to 30 g of a mixture containing 16 g of isododecane, 12 g of isooctane, and 2 g of isopentane.

Using the thermally expandable MSs obtained as described above as is as a sample (non-heat-treated sample), TMA measurement was performed, and the foaming initiation temperature was 195° C.

When the thermally expandable MSs were subjected to TMA measurement after being heat-treated at 150° C. for 5 minutes, the foaming initiation temperature was 156° C. and the highest foaming temperature was 186° C.

The expansion ratio R1 when the thermally expandable MSs had been heat-treated for 5 minutes at 150° C. and then foamed by heating for 2 minutes at 200° C. was 88, and the expansion ratio R2 when the thermally expandable MSs had been heat-treated for 5 minutes at 150° C. and then foamed by heating for 4 minutes at 200° C. was 103. The ratio of the expansion ratio R2 after being heated for 4 minutes relative to the expansion ratio R1 after being heated for 2 minutes [(R2/R1)×100] was determined, and the ratio was 117%.

Comparative Example 1

Thermally expandable MSs having an average particle size of 53 μm were obtained by performing suspension polymerization in the same manner as in Example 1 except for changing the amount of the diethylene glycol dimethacrylate of the crosslinkable monomer to 1.5 g and changing the foaming agent to 30 g of a mixture containing 17 g of isododecane and 13 g of isooctane.

Using the thermally expandable MSs obtained as described above as is as a sample (non-heat-treated sample), TMA measurement was performed, and the foaming initiation temperature was 200° C.

When the thermally expandable MSs were subjected to TMA measurement after being heat-treated at 150° C. for 5 minutes, the foaming initiation temperature was 170° C. and the highest foaming temperature was 189° C.

The expansion ratio R1 when the thermally expandable MSs had been heat-treated for 5 minutes at 150° C. and then foamed by heating for 2 minutes at 200° C. was 40, and the expansion ratio R2 when the thermally expandable MSs had been heat-treated for 5 minutes at 150° C. and then foamed by heating for 4 minutes at 200° C. was 36. The ratio of the expansion ratio R2 after being heated for 4 minutes relative to the expansion ratio R1 after being heated for 2 minutes [(R2/R1)×100] was determined, and the ratio was 90%.

Comparative Example 2

Thermally expandable MSs having an average particle size of 51 μm were obtained by performing suspension polymerization in the same manner as in Example 1 except for changing the amount of the diethylene glycol dimethacrylate of the crosslinkable monomer to 1.5 g and changing the foaming agent to 30 g of a mixture containing 16 g of isododecane, 13 g of isooctane, and 1 g of isopentane.

Using the thermally expandable MSs obtained as described above as is as a sample (non-heat-treated sample), TMA measurement was performed, and the foaming initiation temperature was 194° C.

When the thermally expandable MSs were subjected to TMA measurement after being heat-treated at 150° C. for 5 minutes, the foaming initiation temperature was 155° C. and the highest foaming temperature was 193° C.

The expansion ratio R1 when the thermally expandable MSs had been heat-treated for 5 minutes at 150° C. and then foamed by heating for 2 minutes at 200° C. was 46, and the expansion ratio R2 when the thermally expandable MSs had been heat-treated for 5 minutes at 150° C. and then heated for 4 minutes at 200° C. was 40. The ratio of the expansion ratio R2 after being heated for 4 minutes relative to the expansion ratio R1 after being heated for 2 minutes [(R2/R1)×100] was determined, and the ratio was 87%.

Comparative Example 3

Thermally expandable MSs having an average particle size of 45 μm were obtained by performing suspension polymerization in the same manner as in Example 1 except for changing the amount of the diethylene glycol dimethacrylate of the crosslinkable monomer to 1.5 g and changing the foaming agent to 30 g of a mixture containing 16 g of isododecane, 12 g of isooctane, and 2 g of isopentane.

Using the thermally expandable MSs obtained as described above as is as a sample (non-heat-treated sample), TMA measurement was performed, and the foaming initiation temperature was 195° C.

When the thermally expandable MSs were subjected to TMA measurement after being heat-treated at 150° C. for 5 minutes, the foaming initiation temperature was 150° C. and the highest foaming temperature was 187° C.

The expansion ratio R1 when the thermally expandable MSs had been heat-treated for 5 minutes at 150° C. and then foamed by heating for 2 minutes at 200° C. was 53, and the expansion ratio R2 when the thermally expandable MSs had been heat-treated for 5 minutes at 150° C. and then heated for 4 minutes at 200° C. was 53. The ratio of the expansion ratio R2 after being heated for 4 minutes relative to the expansion ratio R1 after being heated for 2 minutes [(R2/R1)×100] was determined, and the ratio was 100%.

For each of thermally expandable MSs obtained in Examples 1 and 2 and Comparative Examples 1 to 3, results are shown in Table 1.

TABLE 1

|  |  | Example 1 | Example 2 | Comparative Example 1 | Comparative Example 2 | Comparative Example 3 |
|---|---|---|---|---|---|---|
| Polymerizable monomer | Acrylonitrile (g) | 67 | 67 | 67 | 67 | 67 |
|  | Methacrylonitrile (g) | 31 | 31 | 31 | 31 | 31 |
|  | Methyl methacrylate (g) | 2 | 2 | 2 | 2 | 2 |
|  | Crosslinkable monomer (g) | 1.1 | 1.0 | 1.5 | 1.5 | 1.5 |
| Foaming agent | Isododecane (g) | 16 | 16 | 17 | 16 | 16 |
|  | Isooctane (g) | 14 | 12 | 13 | 13 | 12 |
|  | Isopentane (g) | 0 | 2 | 0 | 1 | 2 |
| Average particle size (μm) |  | 49 | 47 | 53 | 51 | 45 |
| Non-heat-treated Ts (° C.) |  | 215 | 195 | 200 | 194 | 195 |
| Ts after treated at 150° C./5 min (° C.) |  | 169 | 156 | 170 | 155 | 150 |
| Tmax after treated at 150° C./5 min (° C.) |  | 188 | 186 | 189 | 193 | 187 |
| Expansion ratio 200° C./2 min (R1) (-fold) |  | 68 | 88 | 40 | 46 | 53 |
| Expansion ratio 200° C./4 min (R2) (-fold) |  | 83 | 103 | 36 | 40 | 53 |
| R2/R1 × 100 (%) |  | 122 | 117 | 90 | 87 | 100 |

Observations

As is clear from the examples and comparative examples, depending on the amount of crosslinkable monomer and particular mixed foaming agent, the expansion ratio after 5 minutes of heat treatment at 150° C. and then 2 minutes of heating and forming at 200° C. and the value of (R2/R1)×100 were significantly different.

That is, in the examples, the expansion ratio after 5 minutes of heat treatment at 150° C. and then 2 minutes of heating and forming at 200° C. was 60 or greater, and the value of (R2/R1)×100 was exceeding 105%. That is, the examples shows that the expansion ratio did not decrease and no sag occurred even after being heated at 200° C. for 4 minutes which was twice the heating time of 2 minutes. Although Example 2 and Comparative Example 3 used the same mixed foaming agent, the value of (R2/R1) 100 was significantly different due to the amount of the crosslinkable monomer. This shows that, even when the components and the amount ratio of the mixed foaming agent were the same as those of the examples, in the entire composition of the thermally expandable MSs, ranges to be selected exist to exhibit effects.

That is, the examples resulted in thermally expandable MSs that had a large average particle size, a high foaming initiation temperature, a high expansion ratio, and little sag.

INDUSTRIAL APPLICABILITY

According to the present invention, thermally expandable MSs that have a large average particle size, a high foaming initiation temperature, a high expansion ratio, and little sag can be provided. That is, since the thermally expandable MSs of the present invention have excellent foaming characteristics at high temperatures, a large average particle size, and a high expansion ratio, excellent cushioning property, reduction in weight, thermal insulation property, and sound insulating property can be achieved with a foam molded article using the thermally expandable MSs. Thus, the thermally expandable MSs are industrially advantageous.

Furthermore, since the thermally expandable MSs of the present invention can sufficiently increase the foaming initiation temperature, undesired early foaming can be effectively suppressed even when the thermally expandable MSs are heated to high temperature when being mixed with various synthetic resins, rubbers, or binder resins.

The thermally expandable MSs of the present invention can be used in fillers for coating materials for automobiles and the like; foaming agents for wallpapers and foaming inks (for applying relief patterns to T-shirts and the like); and shrink preventing agents, as is in the unfoamed state or by utilizing its expandability. The thermally expandable MSs of the present invention can be used for the purpose of reducing weights of polymer materials, coating materials, various materials, and the like, making them porous, and imparting various functionalities by utilizing their volume increase by foaming.

The invention claimed is:

1. A thermally expandable microsphere having a structure in which a foaming agent is encapsulated in an outer shell formed from a polymer,
   the outer shell being formed from (meth)acrylonitrile (co)polymer obtained by polymerizing polymerizable monomers and a crosslinkable monomer;
   the polymerizable monomers being at least one type of nitrile monomer selected from the group consisting of acrylonitrile and methacrylonitrile as a main component and another vinyl monomer that is not methacrylic acid and that is copolymerizable with the nitrile monomer;
   an amount of the crosslinkable monomer being from 0.9 to 1.4 parts by mass per 100 parts by mass of the polymerizable monomers;
   the foaming agent being a mixed foaming agent containing an isododecane isomer mixture and an isooctane isomer mixture; and
   a ratio (%) of (R2/R1)×100 being at least 105%, where R1 is an expansion ratio after the thermally expandable microsphere has been heat-treated for 5 minutes at 150° C. and then foamed by heating for 2 minutes at 200° C., and R2 is an expansion ratio after the thermally expandable microsphere has been heat-treated for 5 minutes at 150° C. and then foamed by heating for 4 minutes at 200° C.

2. The thermally expandable microsphere according to claim 1, wherein the foaming agent further contains a saturated hydrocarbon having 7 or less carbons.

3. The microsphere according to claim 1, wherein the foaming agent includes from 50 to 75 mass % of the isododecane isomer mixture and from 25 to 50 mass % of the isooctane isomer mixture.

4. The thermally expandable microsphere according to claim 2, wherein the foaming agent includes from 45 to 55 mass % of the isododecane isomer mixture, from 30 to 41.5 mass % of the isooctane isomer mixture, and from 3.5 to 25 mass % of the saturated hydrocarbon having 7 or less carbons.

5. The thermally expandable microsphere according to claim 2, wherein the saturated hydrocarbon having 7 or less carbons is an isopentane isomer mixture.

6. The thermally expandable microsphere according to claim 1, wherein the polymerizable monomers are at least one type of nitrile monomer selected from the group consisting of acrylonitrile and methacrylonitrile as a main component and another vinyl monomer that is not a vinyl monomer having a carboxyl group and that is copolymerizable with the nitrile monomer.

7. The thermally expandable microsphere according to claim 1, wherein the R1 is 60 or greater.

8. The thermally expandable microsphere according to claim 1, wherein a foaming initiation temperature after the heat treatment for 5 minutes at 150° C. is 175° C. or lower.

9. A composition comprising the thermally expandable microsphere described in claim 1, and at least one type of polymer material.

10. A molded article comprising a foamed particle obtained by foaming the thermally expandable microsphere described in claim 1.

* * * * *